United States Patent [19]

Fox et al.

[11] Patent Number: 4,461,877
[45] Date of Patent: Jul. 24, 1984

[54] POLYCARBONATE/POLY(ETHYLENE TEREPHTHALATE) RESIN SOLUTIONS

[75] Inventors: Daniel W. Fox, Pittsfield; Edward N. Peters, Lenox; Gary F. Smith, Pittsfield, all of Mass.

[73] Assignee: General Electric Company, Schenectady, N.Y.

[21] Appl. No.: 446,875

[22] Filed: Dec. 6, 1982

Related U.S. Application Data

[63] Continuation of Ser. No. 259,524, May 1, 1981, abandoned.

[51] Int. Cl.³ .............................................. C08L 69/00
[52] U.S. Cl. ..................................... 525/439; 525/466
[58] Field of Search ................ 525/439, 466; 528/171, 528/196

[56] References Cited

U.S. PATENT DOCUMENTS

| | | | |
|---|---|---|---|
| 3,218,372 | 11/1965 | Okamura et al. | 525/439 |
| 3,720,732 | 3/1973 | Sevenich | 525/439 |
| 3,737,409 | 6/1973 | Fox | 260/49 |
| 3,956,229 | 5/1976 | Bollen et al. | 525/439 |
| 3,975,355 | 8/1976 | Bollen et al. | 525/439 |
| 4,029,631 | 6/1977 | Bollen et al. | 525/439 |
| 4,056,504 | 11/1977 | Grundmeier et al. | 525/439 |
| 4,107,251 | 8/1978 | Bollen et al. | 525/439 |
| 4,367,317 | 1/1983 | Fox et al. | 525/439 |

FOREIGN PATENT DOCUMENTS

| | | | |
|---|---|---|---|
| 107052 | 11/1974 | Japan | 525/439 |
| 23125 | 2/1980 | Japan | 525/439 |
| 110153 | 8/1980 | Japan | 525/439 |

OTHER PUBLICATIONS

Schnell, H., "Chemistry and Physics of Polycarbonates", (Interscience, 1964), pp. 32–45.

Primary Examiner—Theodore E. Pertilla
Attorney, Agent, or Firm—Hedman, Gibson, Costigan & Hoare

[57] ABSTRACT

Thermoplastic compositions which are a solution of polycarbonate and poly(ethylene terephthalate) resins are described. These solutions are produced by melt admixture of a polycarbonate prepared from bis(3,5-,dimethyl-4-hydroxy phenyl) sulfone and 2,2-bis(4-hydroxy-phenyl) propane and polyethylene terephthalate) to provide the composition with a single glass transition point.

5 Claims, No Drawings

POLYCARBONATE/POLY(ETHYLENE TEREPHTHALATE) RESIN SOLUTIONS

This is a continuation of application Ser. No. 259,524 filed May 1, 1981, now abandoned.

This invention relates to thermoplastic compositions containing polycarbonate and poly(ethylene terephthalate) resins which are admixed to provide the composition with a single glass transition point (Tg).

The existence of a single glass transition point for such a composition signifies that its resin components are in solution. This state is of great significance for an admixture of different resins, because it insures homogeneity and a unity of properties. These attributes greatly facilitate subsequent processing and the use of the composition.

Poly(ethylene terephthalate) resins useful in accordance with the present invention are well known. They are readily available or may be specially formed by condensation of ethylene glycol with terephthalic acid. Resins having intrinsic viscosities of from about 0.50 to 0.80 dl./g. (as measured in phenol/trichlorethylene) are preferred.

These resins also include copolymers of ethylene terephthalate with other conventional monomer(s). Thus, for example, the resins may include a proportion of other glycols, dicarboxylic acids (desirably aromatic), hydrocarbon (desirably saturated) alcohols and similar modifiers. Preferably, however, at least 65%, more preferably 85% by weight of the resin is composed of ethylene terephthalate units.

Polycarbonates useful in accordance with the present invention are likewise well known and any may be employed. Intrinsic viscosities of from 0.40 to 0.80 dl/g (as measured in phenol/trichloroethylene) are preferred. This resin may be formed from hydrocarbon bisphenol monomer, ordinarily by condensation with a carbonate precursor such as carbonyl chloride. Resins formed from 2,2-bis(4-hydroxyphenyl) propane and bis(3,5-dimethyl-4-hydroxyphenyl) sulfone (referred to as bisphenol or bisphenol A and sulfone or diphenyl sulfone, respectively) are particularly preferred. In a preferred embodiment, for example, copolymer is formed from diphenyl sulfone as described in U.S. Pat. No. 3,737,409 of Fox. For these copolymers, a mole or unit ratio of bisphenol to sulfone of 1:99 to 99:1, more preferably of 1:5 to 5:1, is desirable. The preferred diphenyl sulfone for these resins is bis-(3,5-dimethyl-4-hydroxy-phenyl) sulfone, which may be formed from 2,6-xylenol.

In the present compositions, the proportions of the polycarbonate and poly(ethylene terephthalate) resins may vary widely. Each is commonly present, for example, in an amount of from about 1 to 99%, more normally about 20 to 80%, by total resin weight. While conventional non-polymeric additives may be present as discussed below, these compositions ordinarily do not contain other polymeric components because they may not dissolve in the resin solution. The resin admixtures may be achieved simply by melt mixing the components. This step is normally performed at a temperature about 300° C. for at least about 5 minutes. After melt mixing, a single glass transition point different from those of the individual resin components will be observed. This single point reflects the production of a homogeneous resin solution.

Once formed, the product composition may be employed (or further processed) in conventional manner. Its applications include, for example, tough films useful in packaging. It may also be injection molded to produce a variety of useful thermoplastic articles.

In addition to its two polymeric components, the present compositions may contain any of the conventional non-resin additives for the purposes for which they are known. These additives include fire-retardants, pigments, reinforcing materials such as glass fibers, and the like. They may be combined with the compositions either before or after melt mixing.

The following examples are given by way of illustration only and are not intended as a limitation on the scope of this invention. Many variations are possible without departing from its spirit and scope. Unless otherwise specified herein, all proportions are provided on a weight basis.

EXAMPLE I

A poly(ethylene terephthalate) is admixed with 45% by total resin weight of polycarbonate resin formed from di-xylenol sulfone and bisphenol A in a mole ratio of 1:4.

This admixture is melt mixed at a temperature of about 325° C. for 30 minutes in a Brabender mixing bowl. The composition and comparative properties of the resultant product are as follows:

| Polycarbonate | Poly(ethylene terephthalate) | Composition |
|---|---|---|
| I.V. = 0.61 | I.V. = 0.72 | I.V. = 0.52 |
| Tg = 172° C. | Tg = { 67° C. (amorphous) / 81° C. (crystalline) } | Tg = 108° C. |

The resolution of the distinct glass transition points of the two component resins to the single point for the melt admixed composition shows formation of a homogeneous resin solution.

EXAMPLE II

The process of Example I is repeated substituting 50% by weight of a polycarbonate having a 1:1 mole ratio of sulfone to bisphenol. The comparative results after melt admixture at 325° C. for 5 minutes are as follows:

| Polycarbonate | Poly(ethylene terephthalate) | Composition |
|---|---|---|
| I.V. = 0.48 | I.V. = 0.72 | I.V. = .46 |
| Tg = 202° C. | Tg = { 67° C. (amorphous) / 81° C. (crystalline) } | Tg = 120° C. |

EXAMPLE III

The process of Example I is repeated substituting 45% by weight of a polycarbonate having a 3:1 mole ratio of sulfone to bisphenol. The comparative results after melt admixture at 325° C. for 10 minutes are as follows:

| Polycarbonate | Poly(ethylene terephthalate) | Composition |
|---|---|---|
| I.V. = 0.58 | I.V. = 0.72 | I.V. = .48 |
| Tg = 227° C. | Tg = { 67° C. (amorphous) | Tg = 117° C. |

| Polycarbonate | Poly(ethylene terephthalate) | Composition |
|---|---|---|
| | 81° C. (crystalline) | |

EXAMPLE IV

A poly(ethylene terephthalate) is admixed with 50% by total weight of polycarbonate resin formed from diphenol sulfone and bisphenol A in a mole ratio of 1:1.

This admixture is melt mixed at a temperature of 270° C. for 3–5 minutes in a 1 inch single screw extruder. The composition and comparative properties of the resultant product are as follows:

| Polycarbonate | Poly(ethylene terephthalate) | Composition |
|---|---|---|
| I.V. = 0.58 | I.V. = 0.72 | I.V. = 0.54 |
| Tg = 202° C. | Tg = { 67° C. (amorphous), 81° C. (crystalline) } | Tg = 103° C. |

EXAMPLE V

The process of Example IV is repeated substituting 40% by weight of a polycarbonate having a 1:1 mole ratio of sulfone to bisphenol. The comparative results after extruding are as follows:

| Polycarbonate | Poly(ethylene terephthalate) | Composition |
|---|---|---|
| I.V. = 0.58 | I.V. = 0.72 | I.V. = .060 |
| Tg = 202° C. | Tg = { 67° C. (amorphous), 81° C. (crystalline) } | Tg = 97° C. |

EXAMPLE VI

The process of Example IV is repeated substituting 90% by weight of a polycarbonate having a 1:1 mole ratio of sulfone to bisphenol. The comparative results after extruding are as follows:

| Polycarbonate | Poly(ethylene terephthalate) | Composition |
|---|---|---|
| I.V. = 0.45 | I.V. = 0.72 | I.V. = 0.41 |
| Tg = 197 | Tg = { 67° C. (amorphous), 81° C. (crystalline) } | Tg = 169° C. |

Polymer Synthesis

The DXS/BPA polycarbonates described in the foregoing examples were prepared employing interfacial polymerization in which a rapidly stirred two phase mixture of aqueous caustic, polymer solvent, bisphenols, a phase transfer catalyst, and monofunctional chain terminators is phosgenated. The growing polymer dissolved in polymer solvent, unreacted bisphenols dissolved in the aqueous caustic phase and the polymer forms at the interface. The applicable technology of the synthesis of polycarbonates is described in "Chemistry and Physics of Polycarbonates" by H. Schnell (Interscience, 1964).

The polymer is isolated by precipitation in methanol and dried.

All of the foregoing patents and/or publications are incorporated herein by reference. Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic composition comprising (1) from about 20 to about 80 percent by total resin weight of a polycarbonate resin containing units derived from diphenyl sulfone monomer and units derived from hydrocarbon bisphenol and (2) from about 80 to about 20 percent by total resin weight of poly (ethylene terephthalate) resin, said resins having been prepared by melt mixing, to provide said composition with a single glass transition point.

2. The composition of claim 1, wherein the diphenyl sulfone and hydrocarbon bisphenol units are in a mole ratio of from about 1:5 to 5:1.

3. The composition of claim 2, wherein the hydrocarbon bisphenol is 2,2-bis(4-hydroxyphenyl) propane.

4. The composition of claim 1, wherein the diphenyl sulfone is bis-(3,5-dimethyl-4-hydroxyphenyl) sulfone.

5. A thermoplastic composition comprising:
   (a) from about 20 to about 80 percent by total resin weight of a carbonate copolymer resin containing units derived from bis(3,5-dimethyl-4-hydroxyphenyl) sulfone and units derived from 2,2-bis(4-hydroxyphenyl) propane, the mole ratio of said sulfone units to said 2,2-bis(4-hydroxyphenyl) propane units being from about 1:5 to 5:1 respectively; and
   (b) from about 80 to about 20 percent by total resin weight of poly(ethylene terephthalate) resin, said resins having been prepared by melt mixing to provide said composition with a single glass transition point.

* * * * *